US007258468B2

(12) United States Patent
Peng et al.

(10) Patent No.: US 7,258,468 B2
(45) Date of Patent: Aug. 21, 2007

(54) ASSEMBLING STRUCTURE FOR REPLACEABLE ASSEMBLING LAMP TO IMAGE OUTPUT DEVICE

(75) Inventors: Chih-Kang Peng, Taoyuan (TW); Wen-Chung Ho, Taoyuan (TW); Li-Kuan Wong, Taoyuan (TW); Chang-Chien Li, Taoyuan (TW)

(73) Assignee: Benq Corporation (TW)

(*) Notice: Subject to any disclaimer, the term of this patent is extended or adjusted under 35 U.S.C. 154(b) by 39 days.

(21) Appl. No.: 10/974,349

(22) Filed: Oct. 27, 2004

(65) Prior Publication Data

US 2005/0099816 A1 May 12, 2005

Related U.S. Application Data

(63) Continuation of application No. 10/356,071, filed on Jan. 31, 2003, now abandoned.

(30) Foreign Application Priority Data

Feb. 8, 2002 (TW) ............................... 91102543 A

(51) Int. Cl.
*F21V 19/00* (2006.01)

(52) U.S. Cl. ....................... 362/362; 362/375; 353/119

(58) Field of Classification Search ................ 362/263, 362/265, 285, 362, 368, 372, 375–376; 353/119, 353/87, 100, 101, 72, 74, 79
See application file for complete search history.

(56) References Cited

U.S. PATENT DOCUMENTS 5,243,500 A * 9/1993 Stephenson et al. ........ 362/580
5,829,855 A * 11/1998 Uchiyama .................... 353/74
5,855,488 A * 1/1999 Heintz et al. ............... 439/310
7,152,440 B1 * 12/2006 Austin ........................... 70/58

* cited by examiner

*Primary Examiner*—Renee Luebke
*Assistant Examiner*—Robert J. May
(74) *Attorney, Agent, or Firm*—Snell & Wilmer LLP

(57) ABSTRACT

The present invention provides an assembling structure for replaceably assembling a lamp to an image output device. The image output device includes a housing and a lens. The housing includes a first surface having an opening. The lens is positioned on the first surface. The structure of the present invention includes a body being movably disposed within the housing via the opening and a cover corresponding to the opening. The cover is positioned at a first position for covering the opening, and, as the cover is moved to a second position, the opening is exposed allowing the body to move into or move out of the housing through the opening.

8 Claims, 6 Drawing Sheets

ASSEMBLING STRUCTURE FOR REPLACEABLE ASSEMBLING LAMP TO IMAGE OUTPUT DEVICE

This Application is a Continuation of application Ser. No. 10/356,071, filed Jan. 31, 2003, now abandoned which claims priority to Taiwan Patent Application No. 091102543 entitled "Structure for Replaceably Assembling a Lamp to an Image Output Device" filed Feb. 8, 2002, the entire disclosure of which is incorporated herein by reference.

FIELD OF INVENTION

The present invention relates to an assembling structure for replaceably assembling a lamp to an image output device.

BACKGROUND OF THE INVENTION

Many of commercialized image output devices, such as an overhead projector or a slide projector, use a lamp as the light source to output the image. The user needs to periodically replace the lamp in many image output devices, since the life cycle of the lamp is limited. When designing the image output device, one should consider how to replace the lamp in the future.

Many image output devices have an apparatus for replacing a lamp. In general, the apparatus for replacing a lamp includes a cover, which is secured by screws, and the screws are exposed to the audience affecting esthetic appearance of the image output device.

To solve this problem, an apparatus for replacing a lamp according to prior art is designed to position on the bottom of the image output device to avoid affecting its esthetic appearance. Under this design, the user can replace a lamp only as the image output device is removed from the ceiling, when the image output device is installed over the ceiling. As a result, it is inconvenient and disadvantageous for the user to replace a lamp for this design.

SUMMARY OF THE INVENTION

One aspect of the present invention is to provide an assembling structure for replaceably assembling a lamp to an image output device.

Another aspect of the present invention is to provide an assembling structure for easily replacing a lamp on a plane on that a lens is disposed.

A still further aspect of the invention is to provide an assembling structure capable of improving esthetic appearance of the image output device, while masking the location of lamp replacement.

The present invention provides a structure for replaceably assembling a lamp to an image output device. The image output device includes a housing and a lens. The housing includes a first surface having an opening. The lens is positioned on the first surface.

The structure of the present invention includes a body and a cover. The body is provided for assembling a lamp to an image output device, and is separably disposed within the housing. The user can move the body out of the housing to replace a lamp. The cover corresponds to the opening, and is movably coupled to the housing.

The cover masks the opening when the cover is positioned at a first position, and, as the cover is moved to a second position, the opening is exposed allowing the body to move into or move out of the housing through the opening to replace a lamp.

BRIEF DESCRIPTION OF THE DRAWINGS

The present invention, together with objects and advantages thereof, may best be understood by reference to the following detail description together with the accompanying drawings in which:

FIG. 3(*b*) is a diagram illustrating a cover positioned at a second position of an exemplary embodiment of the present invention;

DETAILED DESCRIPTION OF THE INVENTION

The present invention provides an assembling structure for replaceably assembling a lamp 300 to an image output device 100. The term "an image output device" as used herein includes an overhead projector, a slide projector, and the like.

Figure 1:
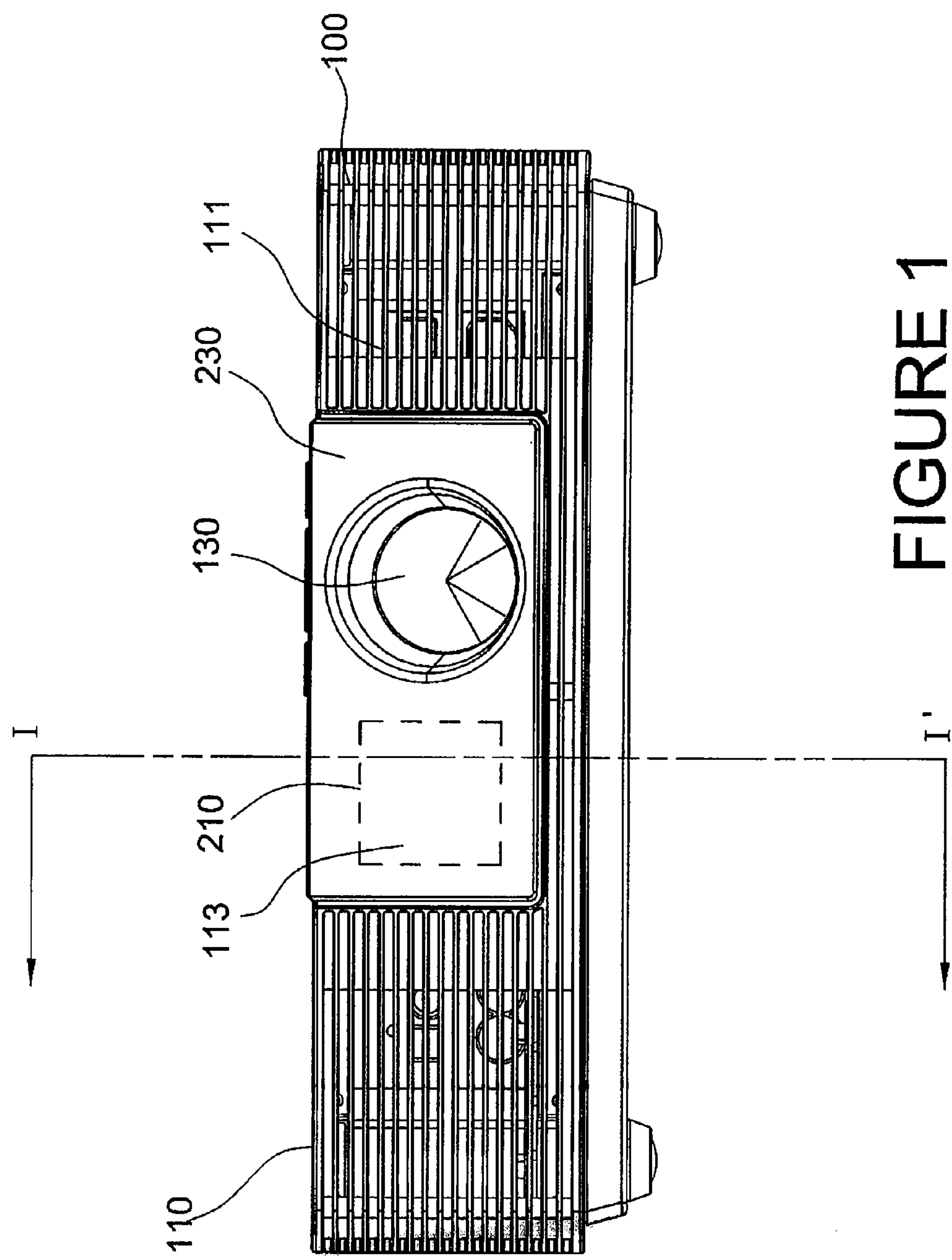
FIG. 1 is a front elevational view showing an exemplary embodiment according to the present invention.

As shown in FIG. 1, which is a front elevational view showing an exemplary embodiment of the present invention, the image output device 100 includes a housing 110 and a lens 130. The housing 110 includes a first surface 111 having an opening 113. The lens 130 is positioned on the first surface 111. The opening 113 is formed on right or left side of the lens 130 according to an exemplary embodiment.

Figure 2:
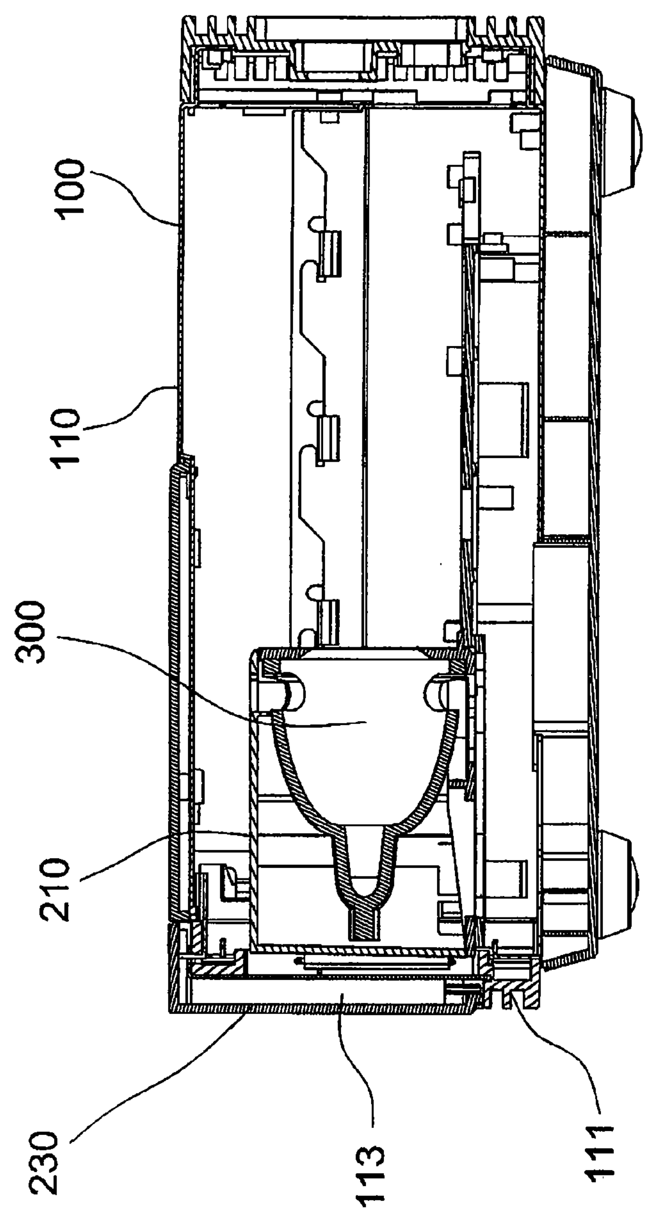
FIG. 2 is a cross-sectional view taken along line I-I' of FIG. 1.

FIG. 2 is a cross-sectional view taken along line I-I' of FIG. 1. In FIG. 1 and FIG. 2, the assembling structure includes a body 210 movably disposed within the housing 110 and a cover 230 corresponding to the opening 113. The body 210 is employed for supporting the lamp 300 and for assembling the lamp 300 to the image output device 100. The user can move the body 210 out of the housing 110 to replace a lamp 300. According to one exemplary embodiment, the body 210 is separated from the housing 110 when the body 210 is moved out of the housing 110. Alternatively, in another exemplary embodiment, the body 210 is coupled to the housing 110 when the body 210 is moved out of the housing 110. The cover 230 is movably coupled to the housing 110. The movable directions include the vertical direction, horizontal direction, rotational direction, or the like.

Figure 3A:
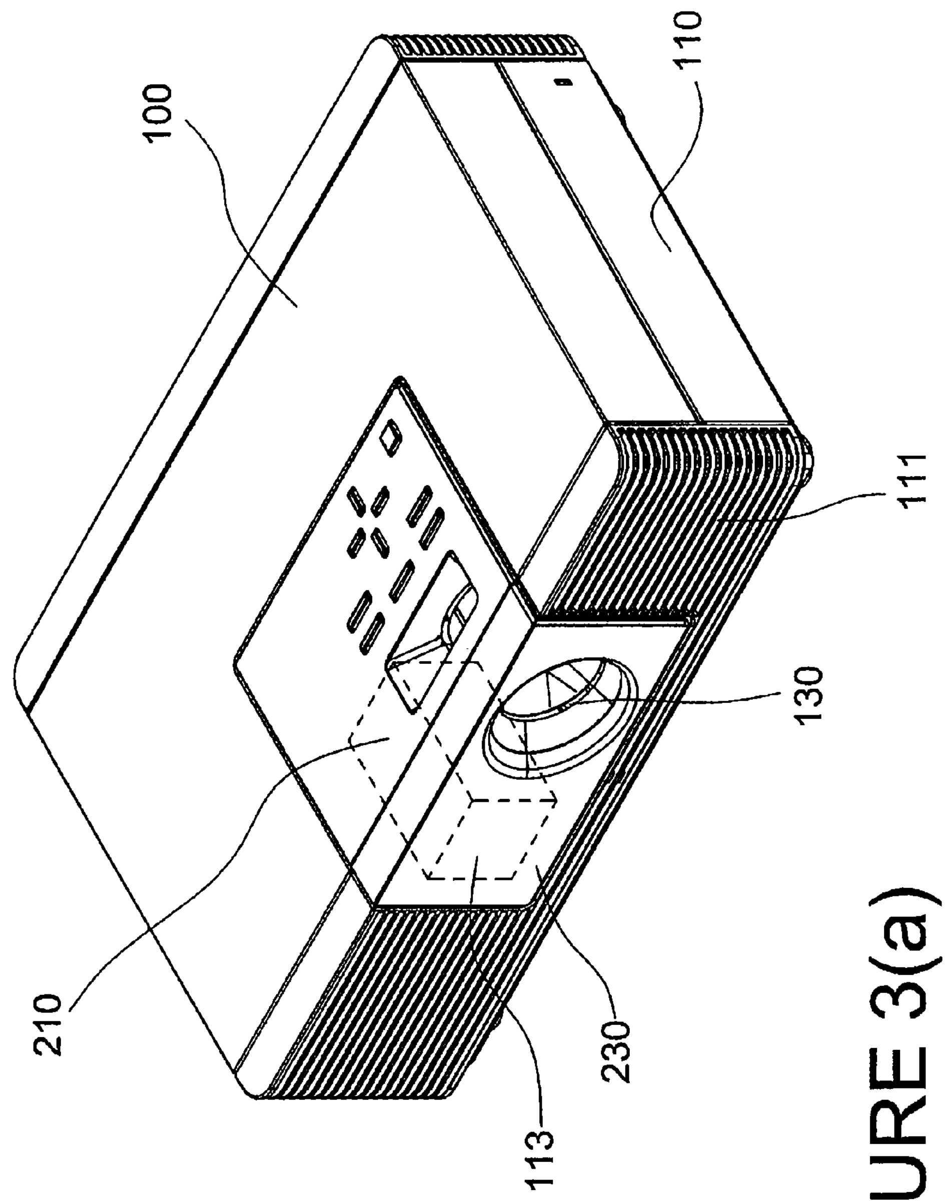
FIG. 3(*a*) is a diagram illustrating a cover positioned at a first position of an exemplary embodiment of the present invention.
Figure 3B:
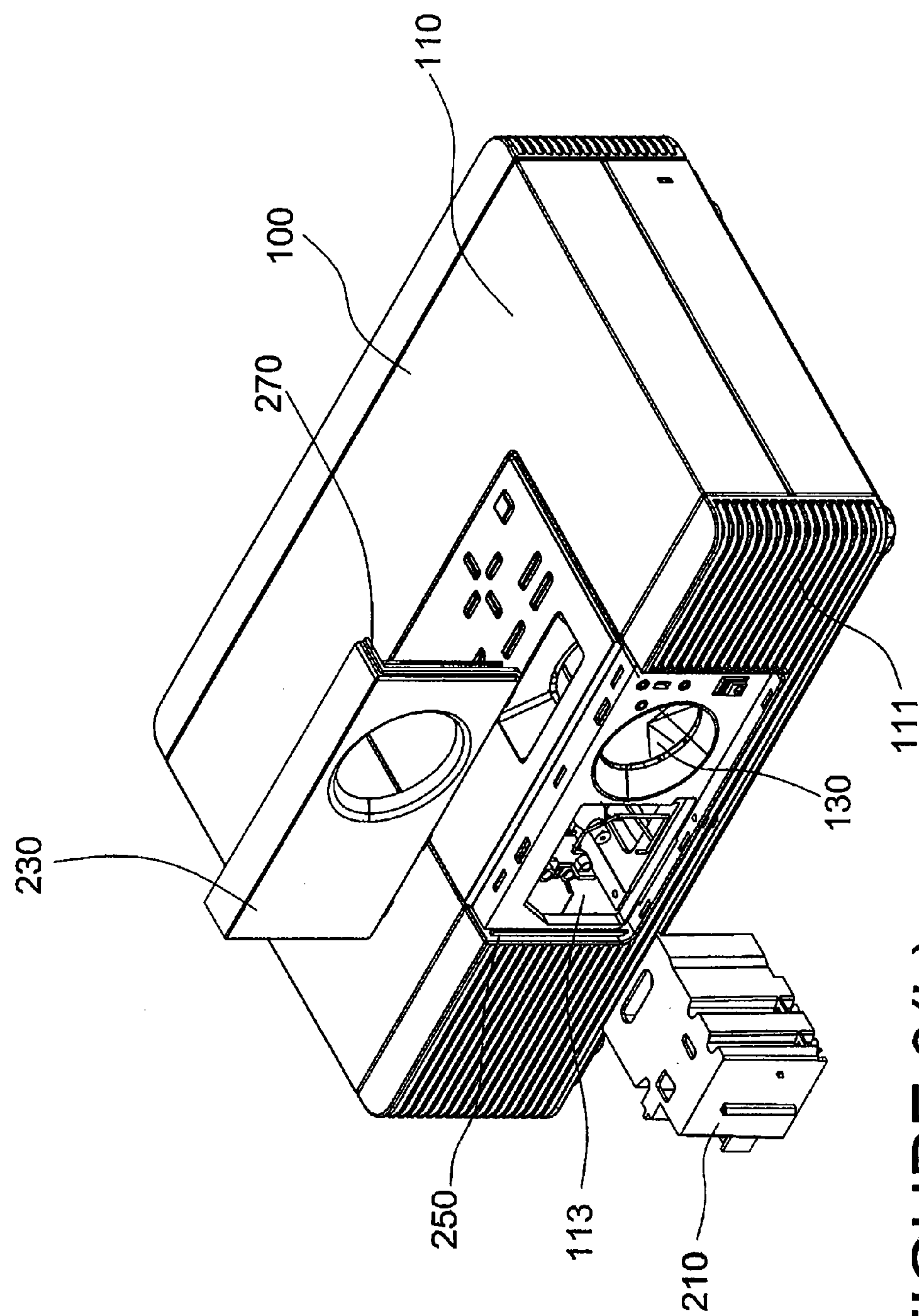

The cover 230 has a through aperture 235. As shown in FIG. 3(*a*), the cover 230 masks the opening 113, and the through aperture 235 is in alignment with the lens 130, so that light passing through the lens 130 can pass through the through aperture 235 when the cover 230 is positioned at the first position. Thus, the opening 113 cannot be seen from the outside of the cover 230. The cover 230 needs to move to the second position before replacing the lamp 300, as shown in FIG. 3(*b*). In that event, the opening 113 is exposed allowing the body 210 to move in or out of the housing 110 through the opening 113.

The term "lamp" as used herein includes an incandescent lamp, a halogen lamp, or the like.

The cover 230 is selectively separably coupled to the housing 110. In the other words, the cover 230 is separably coupled to the housing, or the cover 230 is non-detachably coupled to the housing 110. As shown in FIG. 3(*b*), the cover 230 is separably coupled to the housing 110. The cover 230 could be moved to separate from the housing 110. Alternatively, the cover 230 is non-detachably coupled to the housing 110.

As shown in FIG. 3(*b*), the cover 230 is coupled to and vertically movable to the housing 110. In this embodiment, the cover 230 includes a set of grooves 270, and the housing 110 includes a set of guide rails 250 corresponding to the set of grooves 270 for engaging the cover 230 so that the cover 230 is vertically movable relative to the housing 110. And, in another exemplary embodiment, the cover 230 includes a set of guide rails 250, and the housing 110 includes a set of grooves 270 corresponding to the set of guide rails 250 for engaging the cover 230 so that the cover 230 is vertically movable relative to the housing 110.

Figure 4:
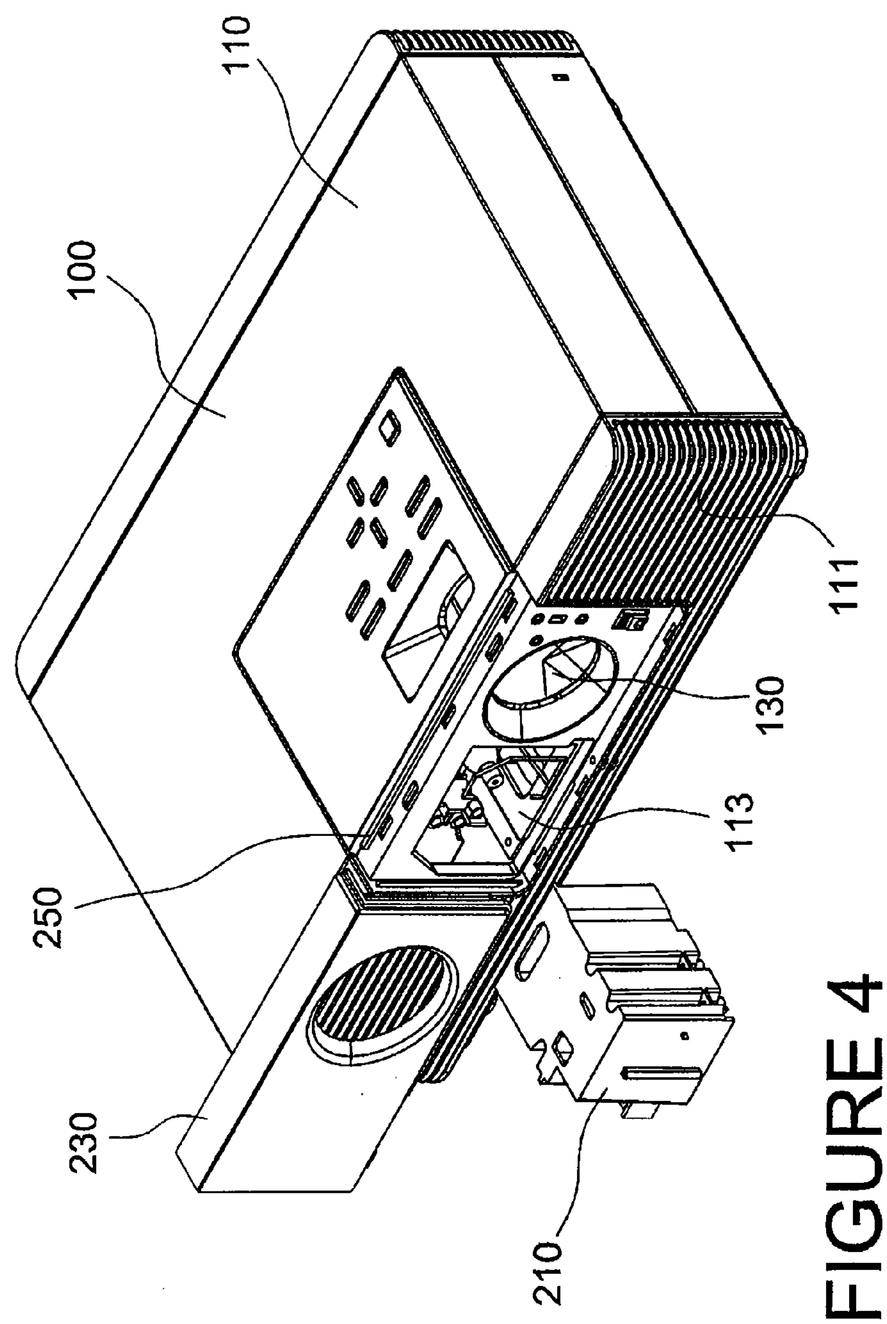
FIG. 4 is a diagram illustrating a cover positioned at a second position of another exemplary embodiment of the present invention.

FIG. 4, which is another exemplary embodiment according to the present invention, illustrates a cover 230 positioned at a second position. In this embodiment, the cover 230 is coupled to and horizontally movable relative to the housing 110. The cover 230 includes a set of grooves 270, and the housing 110 includes a set of guide rails 250 corresponding to the set of grooves 270 for engaging the cover 230 so that the cover 230 is horizontally movable relative to the housing 110. Alternatively, the cover 230 includes a set of guide rails 250, and the housing 110 includes a set of grooves 270 and the cover 230 is horizontally movable relative to the housing 110.

Figure 5:
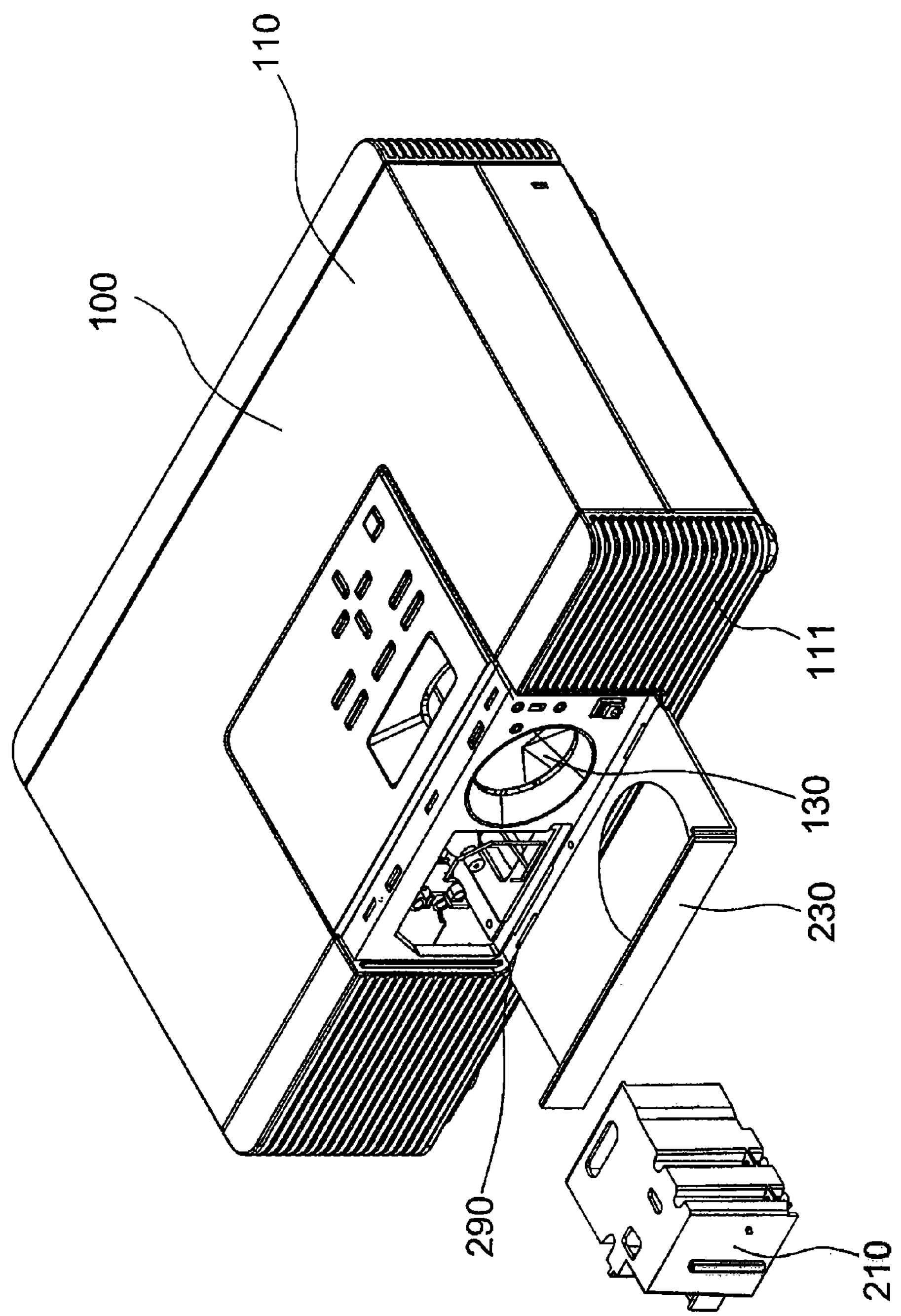
FIG. 5 is a diagram illustrating a cover positioned at a second position of still another exemplary embodiment of the present invention.

FIG. 5, which is still another exemplary embodiment according to the present invention, illustrates a cover 230 positioned at a second position. In this embodiment, the cover 230 is coupled to and rotationally movable relative to the housing 110. The cover 230 includes a hinge 290 for connecting the cover 230 to the housing 110. The hinge 290, acting as a rotation axis, allows the cover 230 to be rotationally movable relative to the housing 110.

Although the invention has been shown and described with respect to the embodiments, it will be understood by those skilled in the art that various changes and modifications may be made without departing from the spirit and scope of the invention as defined in the following claims.

We claim:

1. An image output device, comprising:

a housing including a first surface and an opening formed on said first surface;

a body for supporting a lamp and assembling said lamp to said housing, said body being selectively separably disposed within the housing through said opening;

a lens disposed within said housing for receiving light from said lamp, projecting said light through said first surface to form an image; and a cover having a through hole, wherein the cover is movably coupled to said housing and renders a first position in which the cover masks said opening, and said through hole is in alignment with said lens so that light passing through said lens passes through said through hole, and the cover is allowed to move to a second position to expose said opening and allow said body to move into or move out of the housing through said opening.

2. The image output device of claim 1, wherein said cover is coupled to and vertically movable relative to said housing.

3. The image output device of claim 2, wherein said cover is selectively separably connected with said housing.

4. The image output device of claim 2, wherein said cover includes a set of grooves, said housing includes a set of guide rails corresponding to said set of grooves for engaging said cover so that said cover is vertically movable relative to said housing.

5. The image output device of claim 1, wherein said cover is coupled to and horizontally movable relative to said housing.

6. The image output device of claim 5, wherein said cover is selectively separably connected with said housing.

7. The image output device of claim 5, wherein said cover includes a set of guide rails, said housing includes a set of grooves corresponding to said set of guide rails for engaging said cover so that said cover is horizontally movable relative to said housing.

8. The image output device of claim 1, wherein said image output device includes a hinge for connecting said cover to said housing.

* * * * *